United States Patent
Rosen

[11] Patent Number: 6,144,128
[45] Date of Patent: *Nov. 7, 2000

[54] SAFETY SYSTEM FOR FLYWHEEL SYSTEM FOR MOBILE ENERGY STORAGE

[75] Inventor: Harold A. Rosen, Santa Monica, Calif.

[73] Assignee: Rosen Motors, L.P., Woodland Hills, Calif.

[*] Notice: This patent is subject to a terminal disclaimer.

[21] Appl. No.: 08/905,732

[22] Filed: Aug. 4, 1997

Related U.S. Application Data

[63] Continuation of application No. 08/637,649, Apr. 30, 1996, Pat. No. 5,767,595, which is a continuation of application No. 08/148,361, Nov. 8, 1993, Pat. No. 5,559,381, and a continuation of application No. 08/242,647, May 13, 1994, Pat. No. 5,628,232, which is a continuation-in-part of application No. 08/181,038, Jan. 14, 1994, Pat. No. 5,566,588, and a continuation-in-part of application No. 08/199,897, Feb. 22, 1994, Pat. No. 5,462,402.

[51] Int. Cl.[7] .................................................... H02K 7/02
[52] U.S. Cl. ................................................................ 310/74
[58] Field of Search .................................... 310/74, 67 R, 310/90.5; 74/572

[56] References Cited

U.S. PATENT DOCUMENTS

| | | | |
|---|---|---|---|
| 3,683,216 | 8/1972 | Post ........................................... | 310/74 |
| 3,859,868 | 1/1975 | Post ........................................... | 74/572 |
| 4,603,555 | 8/1986 | Mayer ........................................ | 74/609 |
| 5,559,381 | 9/1996 | Bosley et al. ........................... | 310/90.5 |
| 5,628,232 | 5/1997 | Bakholding et al. ..................... | 74/572 |
| 5,696,414 | 12/1997 | Serdar, Jr. et al. ....................... | 310/74 |
| 5,767,595 | 6/1998 | Rosen ....................................... | 310/74 |
| 5,821,650 | 10/1998 | Gunsallus et al. ....................... | 310/74 |
| 5,841,211 | 11/1998 | Boyes ...................................... | 310/90 |

*Primary Examiner*—Clayton LaBalle
*Attorney, Agent, or Firm*—Westerlund·Powell, P.C.; Raymond H. J. Powell, Jr.; Robert A. Westerlund

[57] ABSTRACT

A flywheel safety support system isolates the flywheel and its motor-generator from the driving environment of an electrically powered motor vehicle. A suitable liquid, placed between the outer and vacuum housings of the flywheel assembly, provides buoyancy and damping to the vacuum housing, cooling of the motor-generator, and serves as one of the barriers to rotor energy and angular momentum transfer in the event of an accident or failure. During normal operation, a shearable mechanical gimbal system keeps the vacuum housing centered in the outer housing, reacts the spin moments generated by the motor-generator, and provides a path for the electrical leads into the vacuum housing. In the event of bearing seizure or rotor failure, the mechanical gimbal will shear and allow the vacuum housing to gradually spin down against the fluid. A fiber barrier provides an additional layer of protection to passengers.

13 Claims, 10 Drawing Sheets

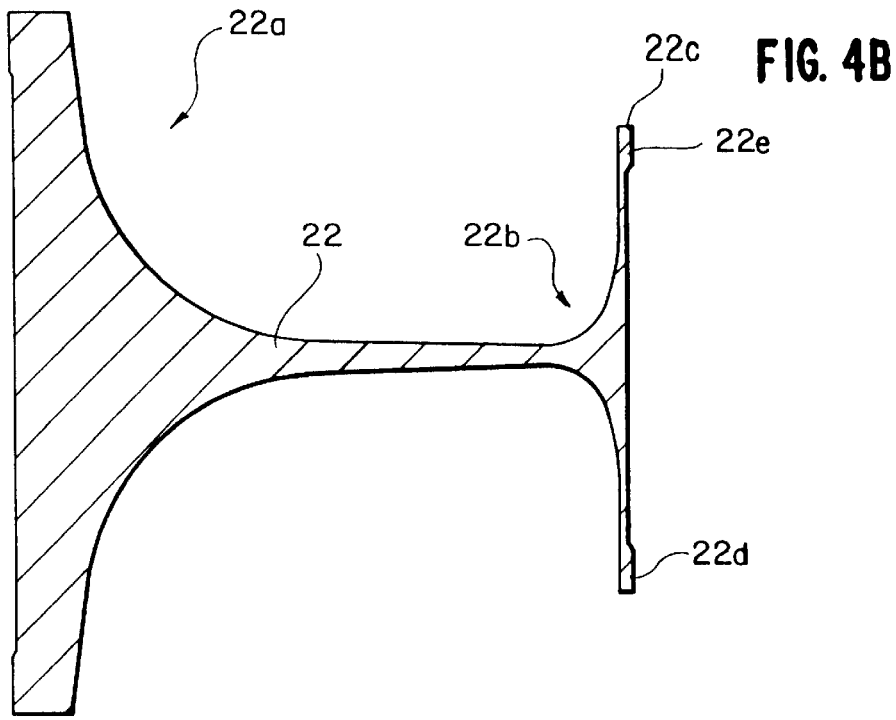
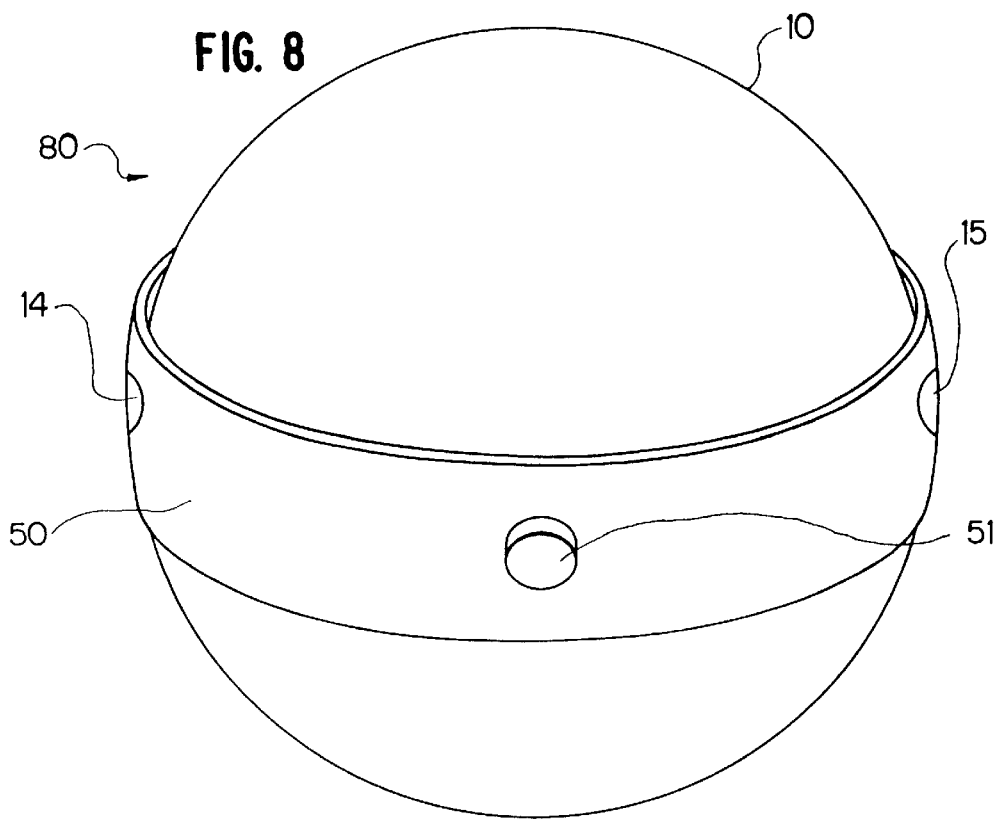

SAFETY SYSTEM FOR FLYWHEEL SYSTEM FOR MOBILE ENERGY STORAGE

This is a Continuation of Ser. No. 08/637,649 (PCT/US94/11809), which was filed on Apr. 30, 1996, now U.S. Pat. No. 5,767,595, which, in turn, is a combined Continuation of Ser. No. 08/148,361, which was filed on Nov. 8, 1993, now U.S. Pat. No. 5,559,381, and entitled "FLYWHEEL SUPPORT SYSTEM FOR MOBILE ENERGY STORAGE", Ser. No. 08/242,647, which was filed on May 13, 1994, now U.S. Pat. No. 5,628,232, and entitled "FLYWHEEL ROTOR WITH CONICAL HUB AND METHODS OF MANUFACTURE THEREFOR", which is a Continuation-in-Part of application Ser. No. 08/181,038 filed Jan. 14, 1994, now U.S. Pat. No. 5,566,588; also entitled "FLYWHEEL ROTOR WITH CONICAL HUB AND METHODS OF MANUFACTURE THEREFOR", and Ser. No. 08/199,897, which was filed on Feb. 22, 1994, now U.S. Pat. No. 5,462,402, and entitled "FLYWHEEL ENERGY STORAGE SYSTEM WITH INTEGRAL MOLECULAR PUMP".

FIELD OF THE INVENTION

The present invention relates generally to a flywheel energy storage device. More specifically, the present invention is related to a flywheel-motor-generator combination providing surge power, dynamic braking, and energy storage for a hybrid electric motor vehicle. The present invention is particularly advantageous when adapted for use in a hybrid electric motor vehicle.

One aspect of the present invention relates to the maintenance of a vacuum within the space occupied by a high speed flywheel rotor. More specifically, the use of a molecular pump incorporated into the flywheel assembly of a flywheel energy storage system to pump gases from a rotor environment into a separate chamber is disclosed. The separate chamber advantageously can contain molecular sieves for adsorbing gas molecules given off by the rotor.

BACKGROUND OF THE INVENTION

The manufacture of electric vehicles powered by chemical batteries is being encouraged by air quality control agencies in an effort to reduce the air pollution created by the internal combustion engines in current use. Even though the electric power utilities which supply the energy used to charge the batteries are themselves polluters, the net result is favorable with respect to air quality. However, the relatively poor characteristics of chemical batteries, in terms of weight, cycle life, and cost make it difficult for them to compete in the market place with internal-combustion engines as the power system of choice.

A hybrid electric power train, consisting of a turbo-generator which generates the average power consumed by the vehicle, a flywheel surge power generator, an electric traction motor, and an electronic power control system can achieve the low pollution levels needed for good air quality, but with performance characteristics which exceed those of the internal combustion engine. Even though the turbine burns hydrocarbon fuels, its use of a catalytic combustor results in less air pollution than that created by the utilities which provide the electricity needed to charge the chemical batteries in vehicles so powered. The separation of the power sources into elements separately optimized to supply the average and the peak power, respectively, coupled with the ability to use dynamic braking, causes the efficiency over most driving schedules to be enhanced and, thus, less fuel is consumed.

A description of a turbo-generator suitable for use in a hybrid electric vehicle is given in a paper by Robin Mackay for the SAE International Congress and Exposition, March, 1994, entitled "Development of a 24 KW Gas Turbine Generator Set for Hybrid Vehicles", which paper is incorporated herein by reference for all purposes. Many different types of electric motors have been used for traction of electrically propelled vehicles for over a century. The present disclosure relates to the design of the flywheel energy storage system. The electric power control system, the fourth major element of the electric power train, is described in a co-pending U.S. patent application Ser. No. 08/246,240, which is entitled "ELECTRIC POWER TRAIN CONTROL" and which is incorporated herein for all purposes.

Modern high strength-to-weight ratio fibers make it possible to construct high energy density flywheels, which, when combined with a high power motor-generators, are an attractive alternative to electrochemical batteries for use as energy buffers in hybrid electric vehicles. A properly designed flywheel system would provide higher energy density, higher power density, higher efficiency, and longer life than a conventional electrochemical battery.

The vehicle environment, however, presents special challenges to successful implementation of a flywheel to motor vehicle applications. Among these challenges are the need to deal with the gyroscopic torques resulting from the vehicle's angular motions and the need to accommodate the translational accelerations of the vehicle. Several safety issues resulting from the high energy and momentum stored in the flywheel also need to be taken into account, as does the difficulty of cooling the motor-generator operating in a vacuum chamber. In addition, energy conservation considerations and user convenience dictate the requirement that the flywheel storage system possess a slow self-discharge rate.

Flywheel energy storage systems have been proposed for many years; many of the storage systems have even been proposed for use in motor vehicles. U.S. Pat. No. 3,741,034, for example, discloses a flywheel contained in an evacuated sphere which is surrounded by a liquid and having various safety features. However, the '034 patent does not address waste heat production and the requirement for cooling the motor-generator. In addition, the '034 patent does not address itself to the dynamics of the driving environment, or the minimization of the power drain when parked. U.S. Pat. Nos. 4,266,442, 4,285,251 and 4,860,611, on the other hand, disclose different ways of constructing high speed rotors. However, the above referenced patents do not recognize, let alone describe, design features needed for compatibility with the environment of a motor vehicle.

Moreover, in order to accommodate a rim speed of about 1000 meters per second, a housing containing the flywheel should be maintained at a very low pressure, e.g., a pressure below 0.01 Pascal, to limit windage losses. While this pressure can be readily achieved before sealing the housing, the fiber composite materials used in the construction of high energy density flywheels have a residual gas evolution rate which make it difficult to achieve this desired degree of pressure, i.e., near vacuum conditions, in a sealed container. Thus, continuous pumping of the evolving gases from the container is often needed. Most often, an external pump is employed to maintain the desired pressure.

U.S. Pat. Nos. 4,023,920, 4,732,529 and 4,826,393 describe various implementations of molecular pumps, which are a class of high vacuum pump wherein the dimensions of the critical elements are comparable to the mean free path of the gas molecules at the pressure of interest. Two types are generally known, a turbo-molecular pump, which is similar in construction to an axial flow compressor in a gas turbine employing interleaved rotor and stator blades, and a molecular drag pump, which uses helical grooves cut in the stator, which, in turn, is disposed in close proximity to a high speed rotor so as to direct gas flow through the pump. It will be appreciated that hybrid molecular pumps, which pumps contains separate sections of each of these types or molecular pumps, are also known. More specifically, U.S. Pat. No. 4,023,920 discloses a turbo-molecular pump using magnetic bearings to support the pump rotor at high rotational speeds. U.S. Pat. Nos. 4,732,529 and 4,826,393 disclose hybrid molecular pumps in which a turbo-molecular section is used on the high vacuum input side and a spiral groove drag pump is used on the discharge side.

All of these pumps are designed as self-contained systems, each with its own shaft, bearing system and power source, i.e., motor. While this solution is satisfactory for stationary systems, it is more difficult to apply in mobile applications because the space and weight for its implementation is not readily available.

As discussed above, flywheel systems currently being designed for mobile energy storage are generally intended to replace batteries in electrically powered vehicles. In such applications, multiple units are needed to store the required energy, so that each motor-generator need supply only a small portion of the vehicle's power. In systems where all of the surge power must be supplied by a single flywheel, the relatively large size of the single motor-generator makes it difficult to provide the needed energy density without reducing safety factors, e.g., for radial stresses, to unacceptable low levels or raising manufacturing costs to exorbitantly high levels.

The above-mentioned U.S. Pat. No. 3,741,034 discloses rotor designs using high strength-to-weight ratio filament wound composites in relatively thin concentric cylinders, which cylinders are separated by radial springs. While this arrangement limits the radial stresses to tolerable values, it is expensive to manufacture. U.S. Pat. No. 3,859,868 discloses techniques for varying the elasticity-density ratio of the rotor elements to minimize radial stresses. On the other hand, U.S. Pat. Nos. 4,341,001 and 4,821,599 describe the use of curved metallic hubs to connect the energy storage elements to the axle. Additionally, U.S. Pat. No. 5,124,605 discloses a flywheel system employing counter-rotating flywheels, each of which includes a hub, a rim and a plurality of tubular assemblies disposed parallel to the hub axis for connecting the hub to the rim while allowing for differential radial expansion between the hub and the rim.

None of the latter references deal with the integration of a large, high power motor-generator into the flywheel energy storage system currently being designed for vehicles.

The present invention was, thus, motivated by a desire to provide an improved flywheel-motor-generator energy storage system suitable for moving vehicles. More specifically, the present invention was motivated by a desire to correct the perceived weaknesses and identified problems associated with conventional flywheel energy storage systems.

SUMMARY OF THE INVENTION

The principal purpose of the present invention is to provide a flywheel energy storage system that is optimized for the motor vehicle environment. According to one aspect of the invention, the flywheel energy storage system provides substantial surge power needed to accommodate transient load requirements associated with the automobile.

An object to the present invention is to provide isolation for the flywheel from the vehicle's angular motions.

Another object of the present invention is to provide support for the rotor during omni-directional accelerations, while maintaining small radial gaps between the spinning and stationary elements.

Yet another object of the present invention is to provide an efficient and compact cooling system for a high-power motor-generator.

Another object of the present invention is to provide protection for the vehicle in which it is contained from accidental release of stored energy and angular momentum.

Still another object of the present invention is to provide an energy storage device having a slow self-discharge rate.

A further object of the present invention is to provide a system located within a sealed chamber for maintaining pressure below a predetermined threshold.

Another object of the present invention is to provide a pressure regulating system for a flywheel energy storage system disposed within a sealed housing wherein a shaft of the flywheel drives a pump for moving gas molecules from a first chamber to a second chamber within the housing.

Yet another object of the present invention is to provide a pressure regulating system for a flywheel energy storage system disposed within a sealed housing wherein bearings supporting a shaft of a flywheel supports rotating elements of a pump moving gas molecules from a first chamber to a second chamber within the housing.

Still another object of the present invention is to provide a pressure regulating system for a flywheel energy storage system disposed within a sealed housing wherein a pump for moving gas molecules from a first chamber to a second chamber within the housing is provided at a low incremental cost.

An additional object of the present invention is to provide a pressure regulating system for a flywheel energy storage system disposed within a sealed housing wherein the pressure is maintained by adsorbing gas molecules moving from a first chamber to a second chamber within the housing on a molecular sieve.

Still another object of the present invention is to provide a high energy density rotor.

Another object according the present invention is to provide a high energy density rotor which includes ample space within its volume for a large, relatively high power motor-generator.

Still another object according the present invention is to provide a high energy density rotor which can be easily manufactured.

Yet another object according the present invention is to provide a high energy density rotor which can be manufactured at a reasonable cost.

These and other objects, features and advantages of the present invention are accomplished by a flywheel energy storage system including a fiber composite energy storing rotor, a high-powered, liquid-cooled motor-generator supported by ball bearings in an evacuated sphere, which sphere floats in a liquid contained in an outer spherical housing. The energy storage system includes a flywheel-motor-generator assembly having a low center of mass location with respect to the evacuated sphere so as to provide a vertical orientation of the flywheel-motor-generator along a rotor axis.

These and other objects, features and advantages according to the present invention are provided by an integral flywheel energy storage system combining a molecular pump into a flywheel energy storage system for vacuum control purposes. The integral flywheel energy storage system includes a sealed housing, a baffle including an orifice dividing the housing into a low pressure first chamber and a relatively high pressure second chamber, a shaft suspended between first bearings located in the first chamber and second bearing in the second chamber, the shaft being disposed within the orifice, a flywheel disposed within the first chamber spinning at high speed, and a molecular pump operatively connected for driving by the shaft for pumping gas molecules from the first chamber to the second chamber. It will be appreciated that other bearing arrangements for operatively supporting the shaft can be used without departing from the spirit and scope of the present invention.

According to one aspect of the invention, the molecular pump is designed into the flywheel assembly so as to permit the high speed motor, shaft, and bearing needed by the molecular pump to be supplied by components already present in the energy storage system. Preferably, the molecular pump transfers the gases evolving from the flywheel rotor and its environs into a separate chamber within the housing of the energy storage system, i.e., contained within the overall vacuum housing. This chamber advantageously may contain so-called molecular sieve materials designed to adsorb the most prevalent of the gases given off by the flywheel rotor. It will be appreciated that other getter materials may also be used throughout the vacuum housing to adsorb trace elements not adsorbed by the molecular sieves.

These and other objects, features and advantages according to the present invention are provided by a molecular pump disposed with a sealed housing of a flywheel energy storage system, wherein the shaft supporting the flywheel powers the molecular pump to maintain gas pressure in the vicinity of the flywheel rotor at or below a predetermined pressure producing negligible drag on the spinning flywheel. It will be appreciated that the molecular pump transfers gas molecules generated by the flywheel rotor material to a receiving chamber which advantageously contains so-called molecular sieves, which adsorb these gas molecules, thereby maintaining the pressure of the receiving chamber at a predetermined second pressure.

These and other objects, features and advantages according to the present invention are provided by a rotor including a generally cylindrical outer portion for storing most of the energy, and a hub portion attaching the outer portion to the shaft. In an exemplary case, the hub portion includes an engineered metallic disc member which can be attached to the outer cylindrical portion via an inner cylindrical member having a relatively short axial extent.

According to another aspect of the invention, the arrangement of rotor components provides the desired geometric properties in a readily manufacturable configuration.

These and other features and advantages of the present invention will become more apparent from the following detailed description, taken in conjunction with the accompanying drawings.

BRIEF DESCRIPTION OF THE DRAWINGS

The preferred embodiments are described with reference to the drawings, in which like elements are denoted by like numbers, and in which:

FIG. 4B is a sectional view of the disc member, which is included in FIG. 4A, is useful in understanding the construction and operation of the disc member, while

FIG. 8 is a detailed illustration of an exemplary mechanical gimbal supporting the flywheel assembly shown in FIG. 3;

DESCRIPTION OF THE PREFERRED EMBODIMENTS

Figure 1:
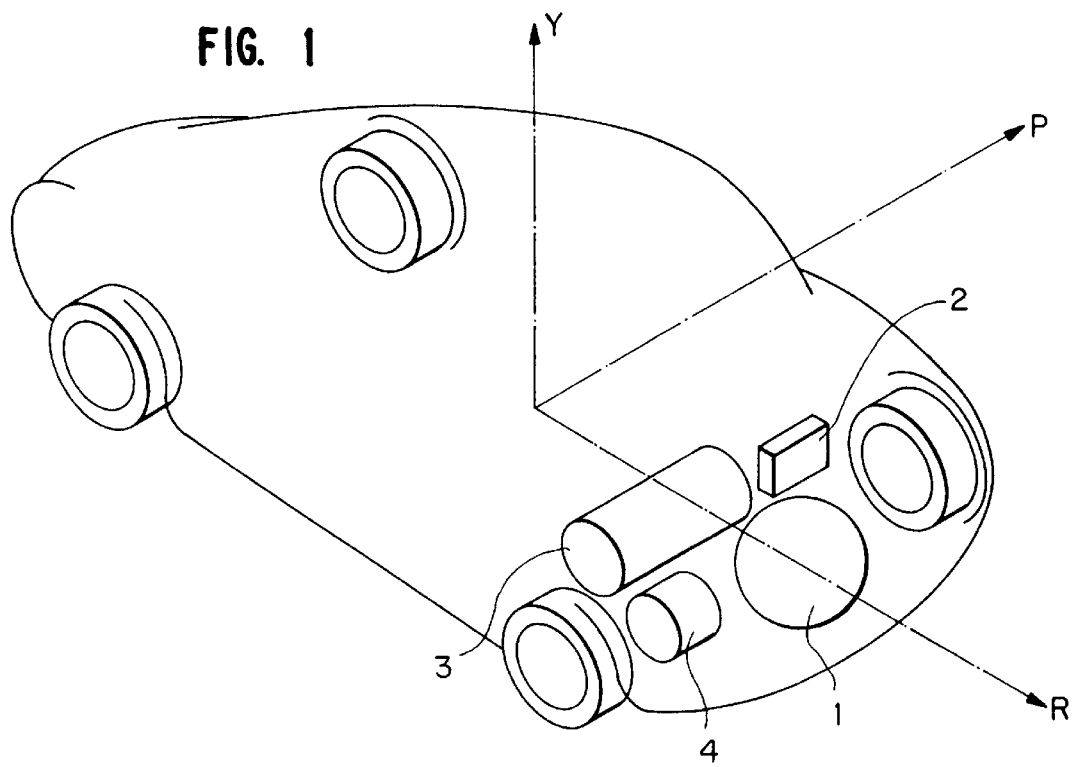
FIG. 1 is a cutaway sketch of a hybrid electric vehicle showing respective elements of its power train.

FIG. 1 shows the power train elements of a hybrid electric vehicle using a flywheel 1 as an energy buffer. In this configuration, the flywheel 1 provides surge power for accelerating the vehicle and for hill climbing, complementing the relatively low, steady power provided by a fuel-burning power source 3, e.g., a turbo-generator set. The flywheel 1 is also used to absorb energy by storing it during dynamic braking and downhill driving. An electric motor 4 converts the electric power from either the flywheel 1 or power source 3 to mechanical motive power. Preferably, all of these elements are regulated by the electronic controller 2.

Figure 2:
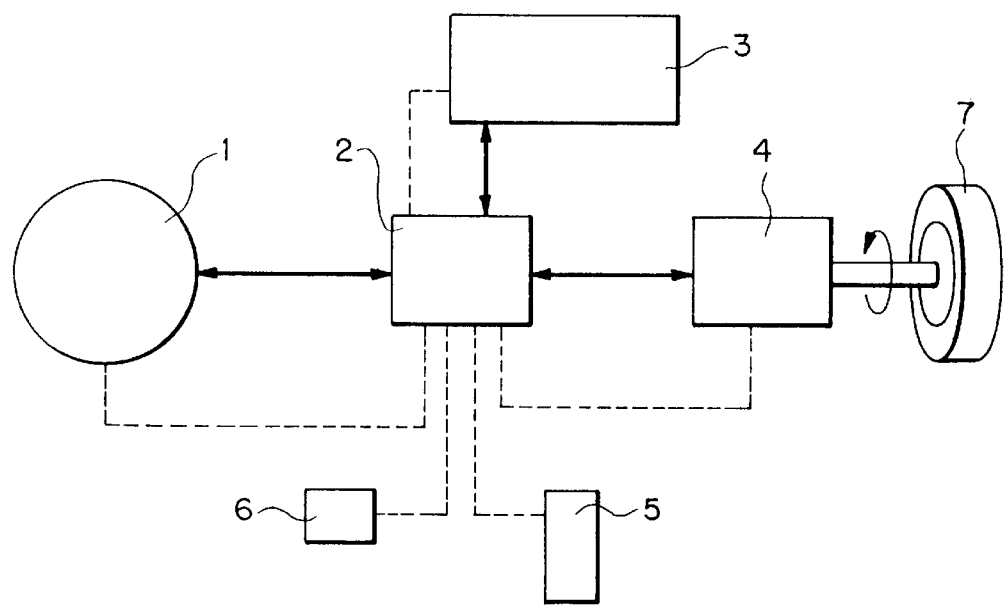
FIG. 2 is a high level block diagram illustrating the power control system of the vehicle shown in FIG. 1.

FIG. 2 is high level a block diagram of a power control system showing how the electronic controller 2 regulates the vehicle's power flow in response to the driver's inputs, which inputs are supplied by the accelerator pedal 5 and the brake pedal 6. Controller 2 channels power to the drive motor 4 from the turbo-generator 3 during cruise conditions and augments this power with power from flywheel 1 for accelerating or hill climbing. Controller 2 advantageously charges the flywheel 1 with power from the drive motor 4 which is acting as a generator during braking or downhill driving. Preferably, controller 2 maintains the speed of flywheel 1 within a predetermined range by charging it from power source 3 to avoid its lower limit or giving flywheel 1 a higher share of the driving load to thus avoid the flywheel's 1 upper limit. Controller 2 also channels power from the flywheel 1 to the power source 3 for starting. In FIG. 2, power leads are designated by solid lines and signal leads are designated by dashed lines.

Figure 3:
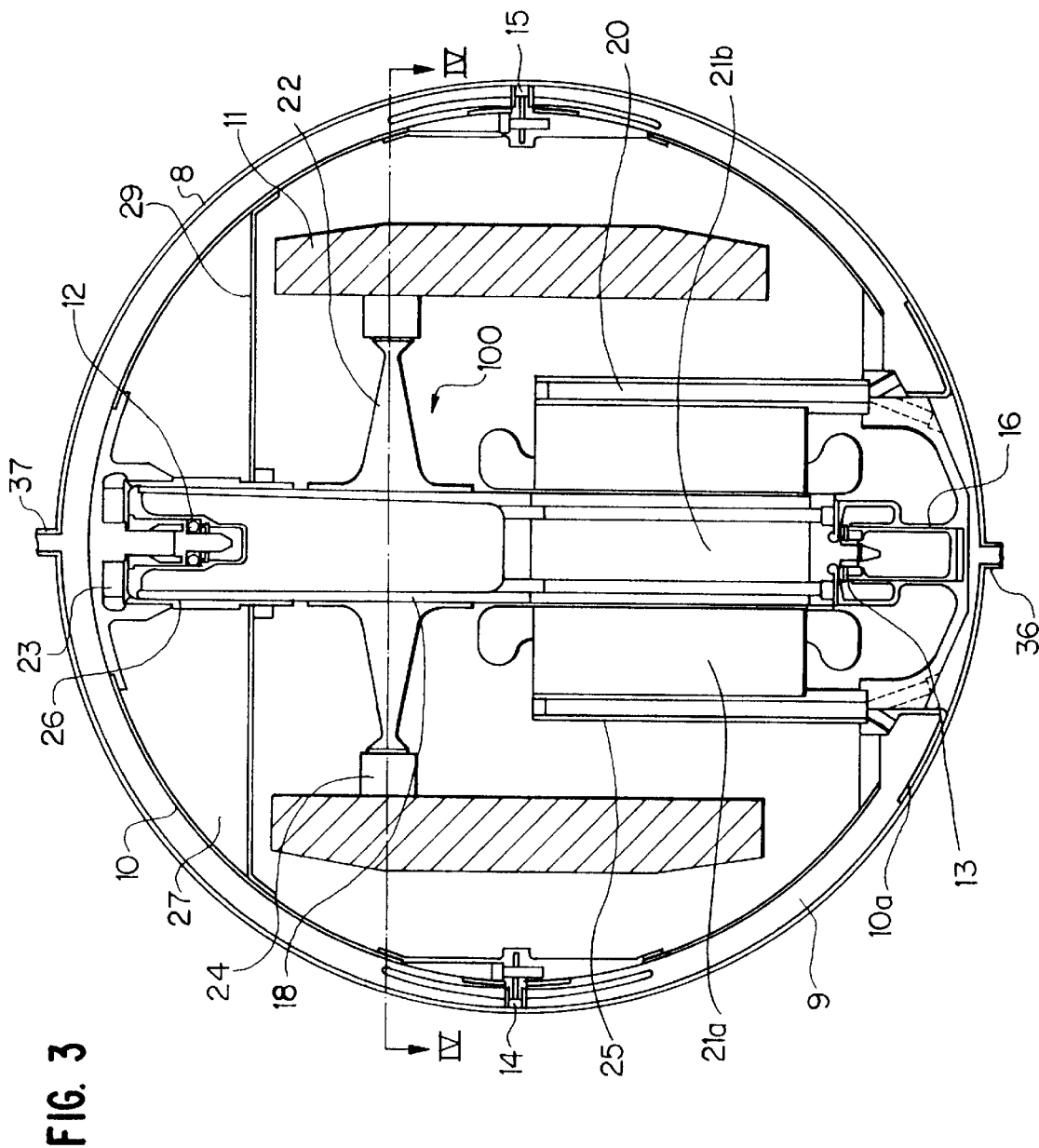
FIG. 3 is an illustration showing the general arrangement of a flywheel assembly according to the present invention.

FIG. 3 is a cross-sectional view of the entire flywheel assembly showing the general arrangement of its parts. An outer housing 8 surrounds the assembly and provides mechanical and electrical connections to the vehicle. The space between housing 8 and a vacuum housing 10 is filled with a liquid 9 in which the vacuum housing 10 floats. It will be noted that bearings 14 and 15 are part of the mechanical gimbal system 80, which advantageously is provided between housings 8 and 10. The gimbal system 80 is discussed in greater detail below while referring to FIG. 8.

The rotating assembly 100 includes a metal shaft 18 and is supported by an upper bearing assembly 12 and a lower bearing assembly 16. A squeeze film damper 145 operates in conjunction with the lower bearing assembly 16. The rotating assembly 100 is powered by a motor-generator 17 including rotor 21a and a stator 21b.

Figure 9:
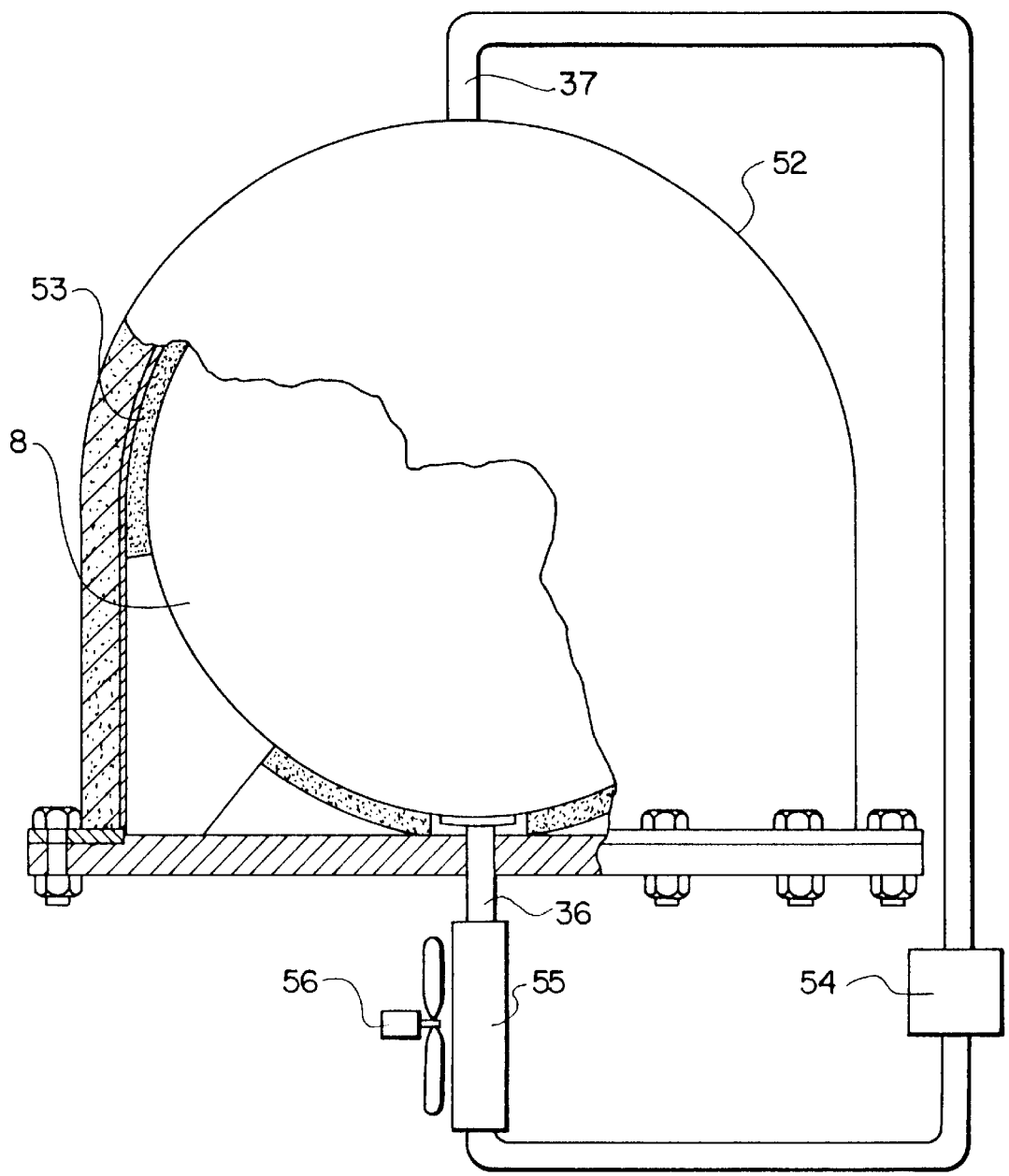
FIG. 9 is an exemplary illustration showing an external protective barrier and the external radiator.

The stator 21b is in good thermal contact with the re-entrant portion 25 of the vacuum housing, i.e., a metal cylinder 20 perforated with axial holes 20a, which provide passageways for flow of the liquid 9. Advantageously, alternate holes 20a can be used for upward and downward flow. All holes 20a are connected together in the top section of cylinder 25 but are separated at the bottom into respective inlet and outlet manifolds 25a, 25b. Flow separator 10a, which advantageously has a small clearance with respect to outer housing 8, causes the liquid which is pumped by an external pump 54 through an external radiator 55 to first flow bi-directionally past the stator 21a, removing its heat, and then through the annular space between the outer housing 8 and the vacuum housing 10. It will be appreciated from FIG. 9 that radiator 55 can be a heat exchanger cooled by a dedicated fan 56. It will also be appreciated from FIG. 3 that flow separator is positioned so as to permit fluid flow through member 25 at all but the severest angles of vehicle operation. Since periods during which the vehicle negotiates large angles are expected to be extremely short, minimal flow interruptions will not produce unacceptable temperature increases in motor-generator 17.

Preferably, the relatively cool liquid 9 pumped from the radiator 55 enters the flywheel 1 via the inlet port 36 and exits the flywheel via outlet port 37 to return to the radiator 55 via pump 54.

The fiber composite cylinder 11 of assembly 100 is connected to the shaft 18 by means of a metallic hub 22 and an axially short fiber composite cylinder 24. Preferably, the metallic hub 22 is formed of aluminum, although any metal, metallic composite or compound having a substantially similar, i.e., similarly high, ultimate strength to modulus of elasticity ratio can be used. The assembly 100 stores energy in the form of rotational kinetic energy, most of it in cylinder 11. A toroidal magnet 23 advantageously can be provided to produce a lifting force equal to the weight of the rotating assembly 100.

A molecular drag pump 26 pumps residual gases evolving from material in the low pressure compartment 28 into compartment 27, which contains molecular sieves 27a to adsorb these gases. These compartments are separated by a metal disc 29.

Figure 4A:
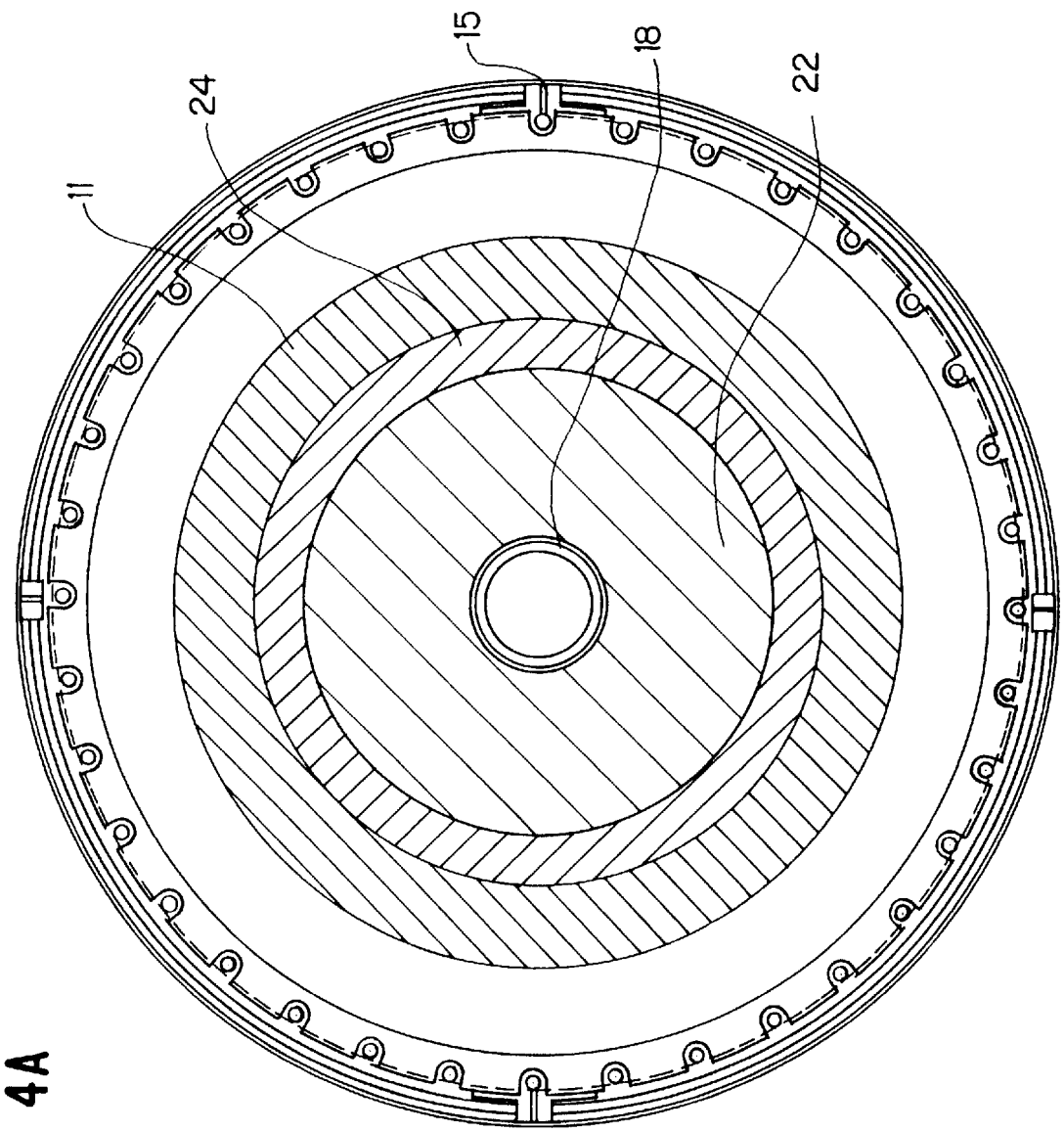
FIG. 4A is a cross-sectional view taken perpendicular to the axis of the flywheel illustrated in FIG. 3.

FIG. 4A is a sectional view taken perpendicular to the axis of rotation of the flywheel 1 shown in FIG. 3, showing an aluminum hub 22 used to connect the shaft 18 to the cylinder 11 through the intermediate cylinder 24. The hub 22, which is shown in the cross-section in FIG. 4B, has an axial thickness which decreases with increasing radius in its main portion 22a. It will be noted that the main portion 22a accounts for the majority of the hub 22. This shape advantageously provides a nearly constant stress at each point along the radius. It will be appreciated that this constant stress profile permits maximal radial growth in this respective portion of hub 22.

At an outermost portion 22b of the radius, the axial thickness increases abruptly to thereby form a radially thin outer cylindrical section 22c. It should be noted that this cylindrical section 22c includes terminating pads 22d and 22e, which advantageously can be bonded to the intermediate composite cylinder 24 shown in FIGS. 3, 4A and 4B. It will also be noted the cylindrical portion 22c flexes in response to variations in applied centrifugal force. It will be understood that the combination of the stretch of the main portion 22a with the flexibility of the cylindrical portion 22c permits pads 22d, 22e to follow the radial growth of the cylinder 24 without overstressing any point of the hub 22.

Preferably, rotating assembly 100, which in an exemplary case is 12 inches in diameter, stores approximately 2 kilowatt-hours, i.e., 7,200,000 joules, of energy at a maximum rotational speed of about 6500 radians per second. It will be appreciated that this corresponds to a surface speed of about 1000 meters per second. It will be noted that this high speed dictates that the rotating assembly be enclosed in an evacuated container. Moreover, the high centrifugal accelerations require that the rotating assembly 100 be constructed primarily of high strength fiber composites, e.g., a filament wound in the circumferential direction.

Figure 4C:
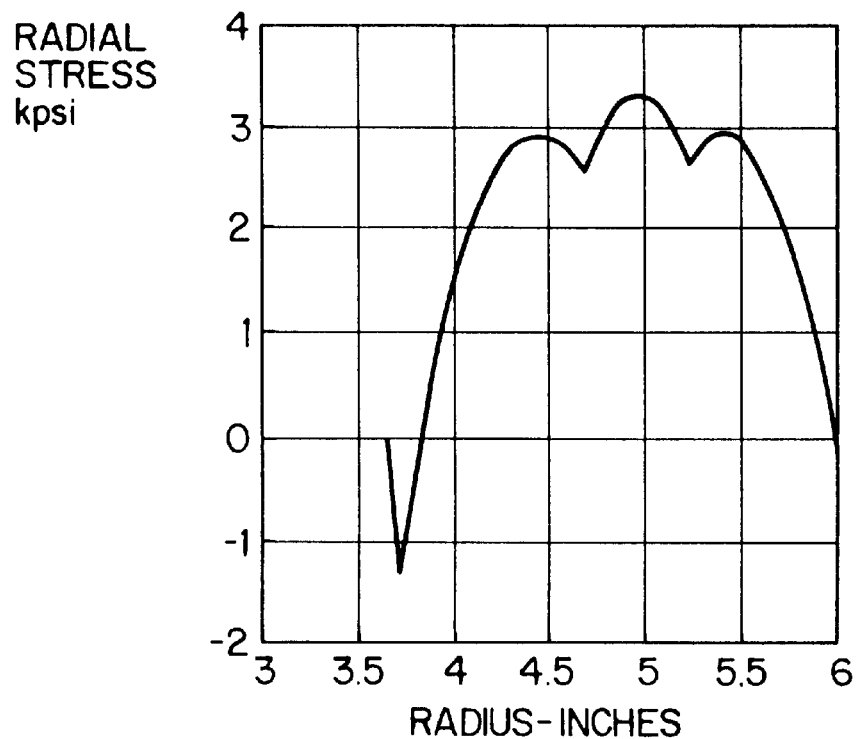
FIG. 4C illustrates radial stress and FIG. 4D illustrates tangential stress in the disc member profiled in FIG. 4B.
Figure 4D:
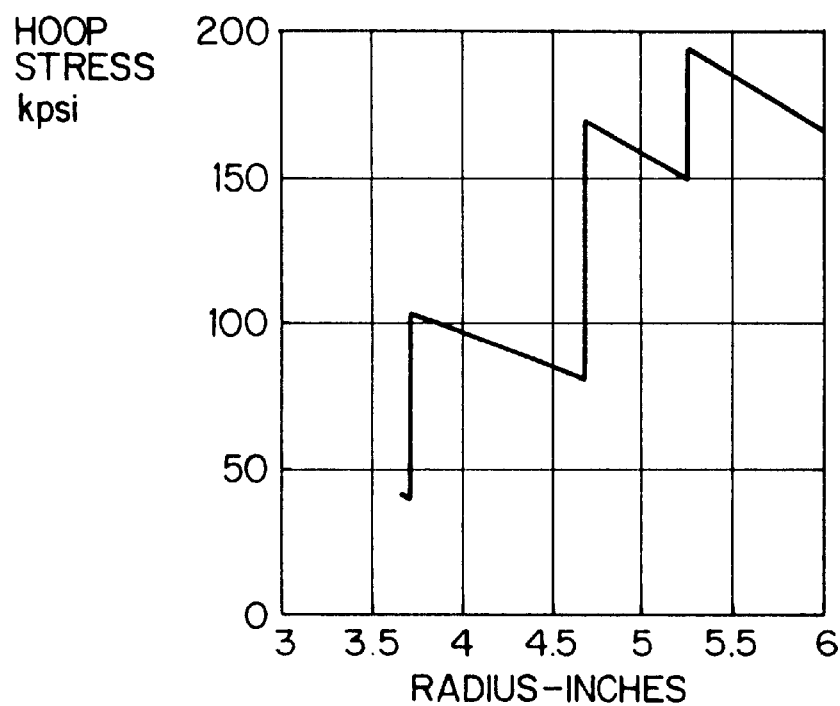

Preferably, rotating assembly 100, which is shown in detail in FIG. 3, includes two major elements, an outer, primarily cylindrical portion 11, which in an exemplary case can be up to 12 inches long, and the metallic hub 22. The inner composite cylinder 24 connects hub 22 with outer composite cylinder 11. The outer composite cylinder 11, which is shown in FIG. 3, consists of two regions, an outermost region 11a, which preferably is a filament wound composite using the highest strength graphite fiber available to sustain the centrifugal acceleration of one million G's, and an innermost region 11b, which is a filament wound fiber composite, whose combination of density and modulus of elasticity create a moderate compressive load on the outermost member 11a. This advantageously minimizes the radial tension in the outermost member 11a. The radial and tangential stresses achieved with this material are shown in FIGS. 4C and 4D, respectively, as discussed in greater detail below.

The highest strength graphite fiber, which is used in fabrication of outermost region 11a, advantageously has a minimum tensile strength of about 924,000 lb/in$^2$ (924 kpsi) while the wound fiber used in the fabrication of composite cylinder 24 has a tensile strength of about 450 kpsi. The cylinder 24 advantageously can be manufactured using a material sold under the brand name "Spectra". It should be noted that the moderate strength graphite fiber used in innermost cylinder region 11b has a minimum tensile strength of about 714 kpsi. High strength aluminum with a minimum tensile strength of about 75 kpsi advantageously can be used in the construction of hub 22, as discussed in greater detail above.

The rotating assembly 100 advantageously can be fabricated as two separate pieces, the hub 22 and outer cylindrical portion including both cylinders 24 and 11. These two pieces advantageously are then mated with an interference fit. It will be appreciated that the interference fit results in compression of the terminating pads 22d, 22e in the direction of shaft 18.

The fiber properties in cylinders 24 and 11 important for this application are tensile strength and modulus of elasticity. The radial stress in these cylinders, which extend from the inner radius of cylinder 24 of 3.7 inches to the outer radius of cylinder 11 of 6 inches, is shown in FIG. 4C to be less than 4000 pounds per square inch at the highest rotational speed, well within the capability of the epoxy matrix material. The matrix material alone bears this stress, since the fiber, being circumferentially wound, makes no contribution to the radial strength. The gradation of the modulus of elasticity of the fibers from 24 million psi in cylinder 24 to 33 million psi for the inner portion of cylinder 11b to 43 million psi for the outer portion of cylinder 11a accounts for the shape of the radial stress curve and its desirably low maximum value.

The hoop stresses in the cylinders are shown in FIG. 4D. They are seen to be a maximum of 100,000 psi in cylinder 24 and 200,000 psi in cylinder 11. These stresses are borne by the fibers, and are well below the ultimate capabilities of the materials employed. The fiber used in cylinder 24 has an ultimate tensile strength of 435,000 psi, which is reduced by the fill factor of two thirds in the composite to 290,000 psi. The fiber in the inner portion of cylinder 11 has a reduced ultimate strength of 476,000 psi, and the fiber in the outer portion has a reduced ultimate strength of 616,000 psi. The factor of three in strength indicated allows for both degradation due to fatigue and a substantial margin of safety.

The cylinder 11 is assembled onto cylinder 24 with an interference fit, as is the cylinder 24 onto the hub 22. This causes the hub to be in compression when the rotor is at rest, which reduces its radial growth and tension when the rotor is spinning. This technique allows the metal hub to match the radial growth of the composite cylinders without being overstressed.

Figure 5:
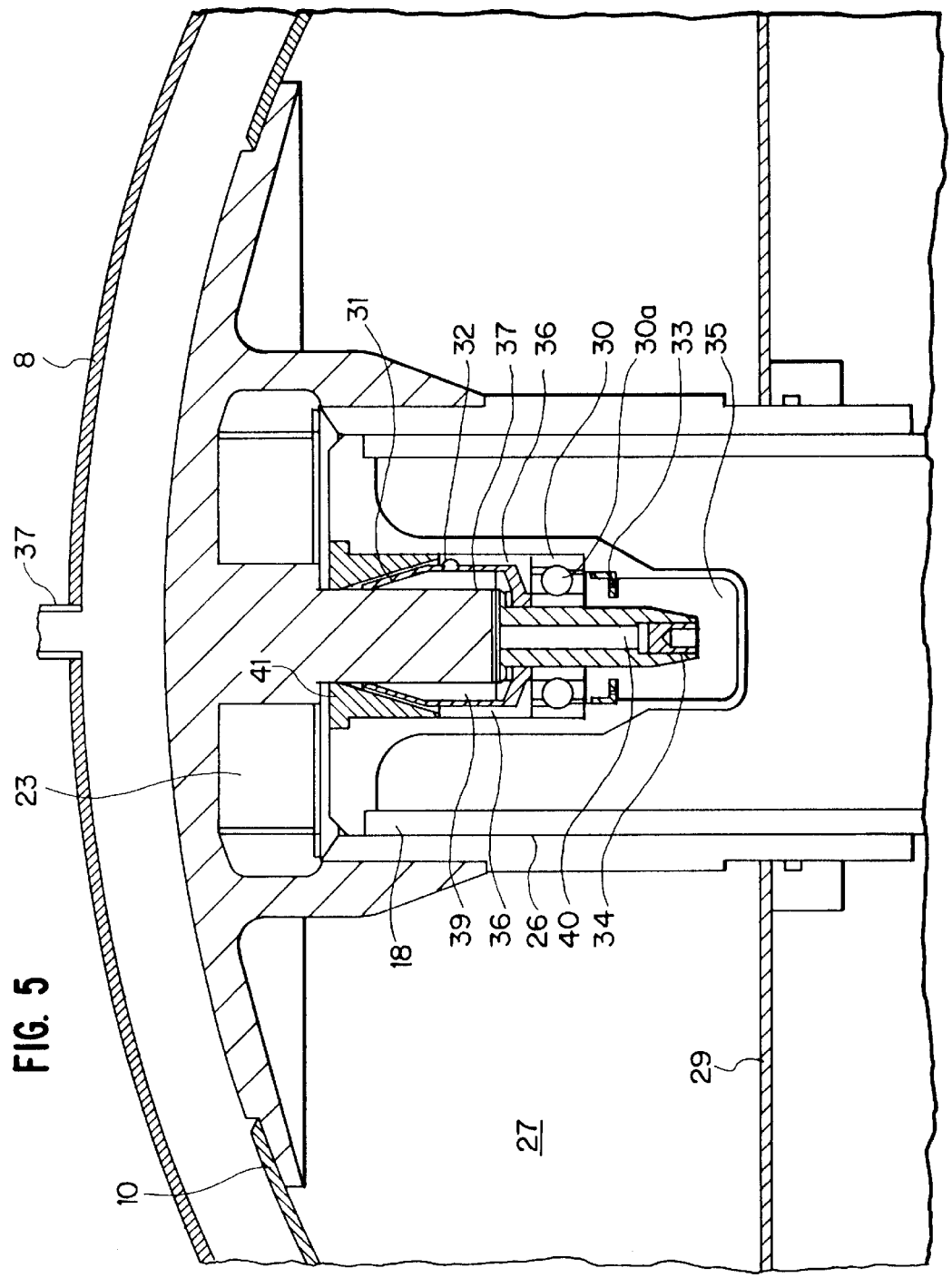
FIG. 5 is a detailed illustration of the upper bearing assembly and its lubrication system of the flywheel illustrated in FIG. 3.

FIG. 5 gives details of the upper bearing assembly 12. Preferably, an angular contact bearing 30, using ceramic balls 30a to provide long bearing life, supports the spinning shaft 18 disposed in vacuum housing 10. Bearing 12 advantageously can be lubricated by means of a circulating oil system in which oil pumping action is provided by a combination of centrifugal and gravitational forces. When oil in a spinning reservoir 36, whose free surface forms a vertical cylinder when the shaft 18 is spinning, exceeds its desired level, a scoop 32 connected to a stationary shaft 37 scoops the excess oil into stationary reservoir 39. Preferably, the oil then flows by gravity from reservoir 39 to central chamber 40. The oil thus collected is discharged to spinning chamber 35. Advantageously, the flow rate is regulated by the oil flow metering plug 34 through which the oil passes between central chamber 40 and spinning chamber 35. Centrifugal force in spinning chamber 35 throws the thus-introduced oil radially outward. This advantageously permits the flow of oil to pass through oil flow holes 33 so as to enter the bearing 30. The centrifugal force in the rotating portions of the bearing 30 slings oil into the spinning reservoir 36, thus permitting the cycle to begin anew.

It will be appreciated that the small gap 31 between the stationary and rotating conical surfaces of bearing 12 shown in FIG. 5 acts as an effective seal or trap which prevents oil droplets from escaping from the vicinity of bearing 12 into flywheel chamber 27. Any oil droplets which might enter gap 31 advantageously can be accelerated outwardly by the spinning wall of conical member 41 and, thus, caused to reenter the spinning reservoir 36.

It should be noted that before shaft 18 begins to rotate, the oil resides in spinning chamber 35. Once shaft rotation begins, the above-described oil circulation cycle begins.

Figure 6:
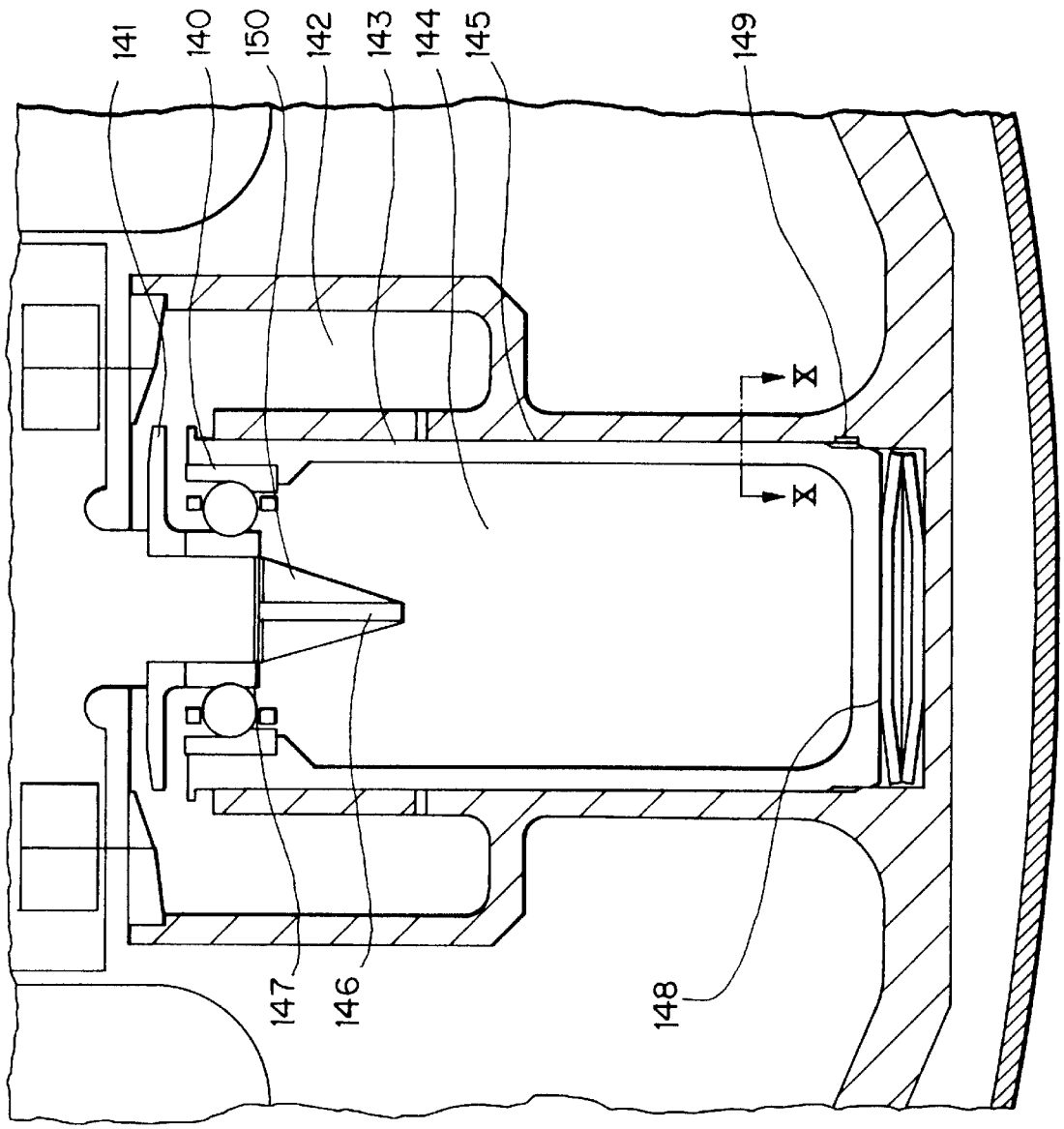
FIG. 6 is a detailed illustration which is useful in understanding the construction and operation of lower bearing system and the associated lubrication system for the flywheel illustrated in FIG. 3.

FIG. 6 is an illustration which finds use in explaining the operation of the lower bearing assembly 16. Preferably, bearing 140 is of the angular contact type which advantageously uses ceramic balls 140a to accommodate long life, just as in the upper bearing 12. Bearing 140 can be lubricated by a circulating oil system.

Figure 10A:
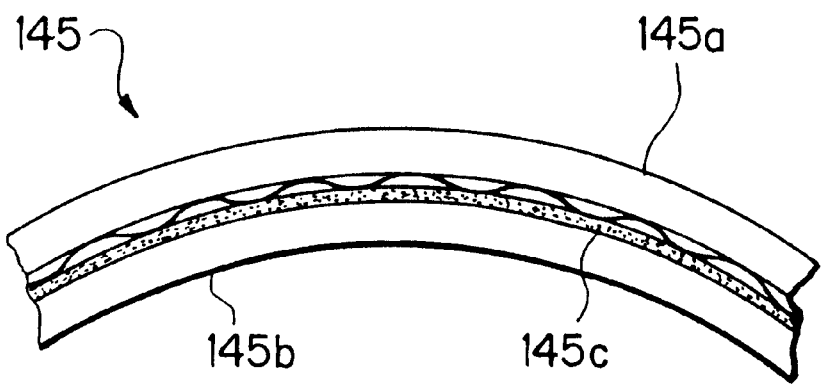
FIG. 10A and FIG. 10B are illustrations which are useful in explaining the construction and operation of a squeeze film damper employed by the flywheel shown in FIG. 3 in the bearing of FIG. 6.

Preferably, the circulating oil system 130 includes a rotating disc 141 which slings lubricating oil from the rotating part of bearing 140 outward into a reservoir 142. It should be noted that the oil level in reservoir 142 is indicated by the dashed line. Lubricating oil flows through hole 143 into a squeeze film damper 145, whose narrow annulus formed by concentric metal cylinders 145a, 145b contains a radial spring 145c as well as lubricating oil. Details of the squeeze film damper 145 are shown in FIG. 10, wherein FIG. 10A is an axial view of a small arc of squeeze film damper 145 illustrating the annular space between concentric cylinders 145a and 145b occupied by radial spring 145c.

Figure 10B:
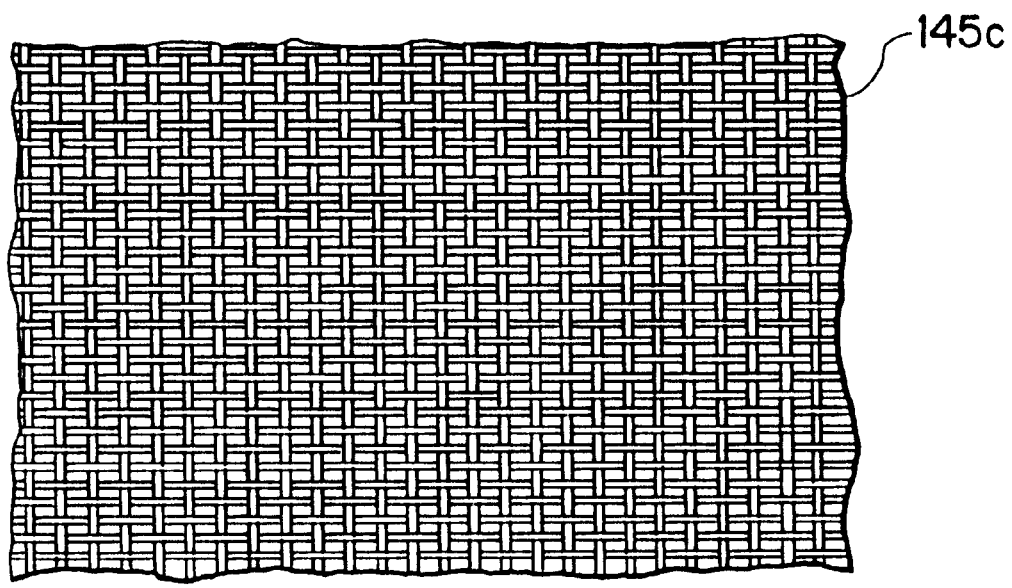

Preferably, radial spring 145c is a chemically etched part whose etch pattern is as illustrated in FIG. 10B. It will be appreciated that when the radial spring 145a is wrapped around cylinder 145a, the half rectangles of the pattern will stick out substantially, forming hundreds of elementary springs whose ends contact the inner surface of cylinder 145b. The space between the cylinders 145a, 145b not occupied by the radial spring 145c is filled with lubricating oil. Advantageously, the spring 145c gives a restoring force to counteract the radial displacement of the outer cylinder 145a, which is connected to the vacuum sphere 10, with respect to the inner cylinder 145b, which is rotably coupled to the spinning shaft 18 via bearing 140.

The presence of viscous oil in this annulus produces a radial force proportional to the rate of this displacement. The squeeze film damper 145 acts as a means for limiting the amplitude of vibrations at shaft critical frequencies caused by residual unbalance of the rotating assembly 100.

Referring to FIG. 6, lubricating oil enters reservoir 144 through hole 149 at the bottom of squeeze film damper 145. It should be noted that the oil level in reservoir 144 is indicated by the dashed line. Lubricating oil enters the vertical hole 146 in spinning cone 150 and flows out through radial holes 147 to thereby impinge on the rotating part of bearing 140, and thereby begin its circulatory cycle anew.

Advantageously, a double Belleville washer 148 can be used to preload both bearing 12 and bearing 16. It will be noted washer 148 produces an axial force on the curved races of bearings 12, 16, which advantageously squeezes the balls in each respective bearing radially. The stress thus produced creates the desired area of contact between the balls and the associated races, which, in turn, produces the desired radial stiffness of the bearing assembly. It will be appreciated that since most of the service life of the bearings is spent with the preload as the only load, the preload is kept as small as consistent with the radial stiffness requirement, thus maximizing bearing life.

Figure 7:
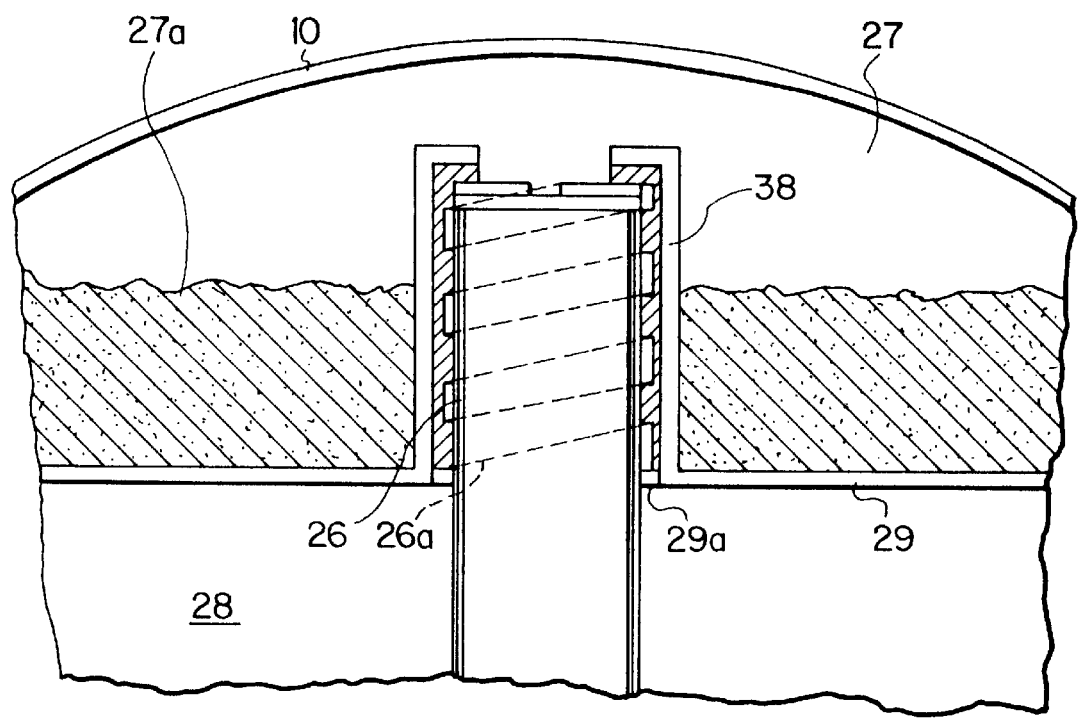
FIG. 7 illustrates the molecular drag pump used to maintain adequate vacuum in the chamber containing the flywheel rotor for the flywheel illustrated in FIG. 3.

FIG. 7 shows the construction of the molecular drag pump 26 which advantageously maintains the pressure in vacuum housing 10 at a predetermined pressure. It will be noted that gases slowly evolve from the flywheel materials. Preferably, molecular drag pump 26 pumps the offending gas molecules from the chamber 28 in which the shaft 18 spins into chamber 27, which contains molecular sieves 27a. It will further be noted that molecular sieves 27a preferentially adsorb the pumped gas molecules. This pumping action advantageously maintains the gas pressure in chamber 28 low enough to achieve low aerodynamic drag and, thus, minimize heat generation due to the spinning fiber composite cylinder 11 of assembly 100, whose surface speed can easily exceed 1000 meters per second. Drag pump 26 consists of a spiral groove on the inside of the stationary cylinder 38 in close proximity to the spinning shaft 18. Since the bearing assemblies 12, 16 and motor 17 used for powering drag pump 26 are those required for the flywheel 1, the additional cost of adding this important function is negligible.

More specifically, a separate gas storage chamber 27, located proximate to one of the bearings 12, 16 is formed by a baffle plate 29. It will be appreciated from FIG. 7 that baffle plate 29 includes an orifice 29a for positioning of the shaft 18. Preferably, the bearing 12 is disposed within molecular pump 26, which advantageously may be a molecular drag pump 26. Preferably, gas storage chamber 27 contains so-called molecular sieves 27a, which will be discussed in greater detail below.

The purpose of the present invention is to maintain a high vacuum in the space in which the flywheel rotor spins so that a negligible drag on the flywheel rotating assembly 100 will be produced. It will be appreciated that at a preferred rim speeds of about 1000 meters per second, the pressure in housing 10 should be less than to 0.01 Pascal. It will also be noted that the fiber composite materials used in the construction of high energy density flywheels, i.e., flywheel assembly 100, have a propensity for residual gas evolution at a rate which make it difficult to achieve this desired degree of vacuum in a sealed container. Therefore, continuous pumping of the evolved gases from the container in conventional systems is often performed using an external In contrast to these conventional systems, a molecular pump, which is designed into the flywheel 1, and which employs the high speed motor, shaft, and bearing system already present in the flywheel energy storage system, transfers the gases evolving from the flywheel assembly 100 and its environs into a separate chamber 27, which chamber is fully contained within the overall vacuum housing 10. Advantageously, chamber 27 contains molecular sieves 27a designed to adsorb the most prevalent of the gases generated by, e.g., cylinder 11. Preferably, getters are disposed throughout the vacuum housing 10 to adsorb trace quantities of gases which are not readily adsorbed by molecular sieves 27a.

The flywheel assembly 100, in an exemplary case, is 12 inches in diameter and has a maximum rotational speed of 6500 radians per second. This rotational speed corresponds to a surface speed of 1000 meters per second, which high speed requires that the surrounding gas pressure be maintained at a pressure less than 0.01 Pascal in order to permit a sufficiently long self discharge time.

It will be appreciated that even though the flywheel assembly 100 will be exposed to a high temperature bakeout while vacuum housing 10 is being evacuated prior to being sealed, the high mass of the volatile materials of the composites, particularly the epoxy, employed in the construction of flywheel assembly 100 can be expected to produce a residual gas evolution rate which could exceed the allowable pressure for the vacuum housing 10 in a relatively short time. The molecular drag pump 26 advantageously can be used to pump these gases into gas storage chamber 27 where the gases can be adsorbed by the molecular sieves 27a. It will be appreciated that the pressure in housing 10 can, thus, be maintained in the vicinity of the flywheel cylinder 11, even though the pressure in the storage chamber 27 may rise as high as one Pascal.

It will also be appreciated that, e.g., molecular drag pump 26 would be too expensive an item to be used for maintaining the pressure of housing 10 below its maximum allowable pressure if molecular drag pump 26 were to be provided as a self contained item, principally because of the cost of the high speed bearings and motor required by stand alone molecular pumps of any configuration. By integrating molecular drag pump 26 into the design of flywheel assembly 100, the shaft, bearings, and motor of the flywheel assembly 100 advantageously can be used by molecular drag pump 100. It will be noted that the incremental cost of incorporating the molecular pump into the flywheel energy storage system is very low.

Molecular sieves are adsorbents whose pores are tailored in size to the dimensions of the molecules to be adsorbed. They are available under the trade name MOLSIV from the Union Carbide Corporation. Their ability to adsorb is strongly influenced by pressure, e.g., the adsorption ability is low at the pressure normally applied to flywheel assembly 100. It should also be noted that at the normal operating pressure of gas storage chamber 27, i.e., a pressure $P_2$ which is approximately one thousand times higher than a pressure $P_1$ felt throughout housing 10, the molecular sieves 27a are capable of adsorbing all of the gases evolved from flywheel assembly 100. In other words, at the upstream pressure $P_1$ of the molecular drag pump 26, the adsorption rate of the target gas molecules produced by the flywheel assembly 100 is low. The adsorption rate increases as the pressure $P_2$ in chamber 27 is increased. Preferably, molecular sieve material is selected so that a minimum adsorption rate, e.g., the minimum adsorption rate necessary to match the gas molecule evolution rate of flywheel assembly 100, is achieved at a pressure lower than the shut off head of the molecular drag pump 26.

Preferably, a helical groove 26a cut into the stator of drag pump 26 provides the flow path for the evolved gases from the high vacuum chamber, at pressure $P_1$, e.g., 0.01 Pascal, to the chamber 27 containing the molecular sieves 27a in which the pressure $P_2$ may be as high as 10.0 Pascal.

It will be appreciated that an alternate embodiment of the present invention wherein a turbo-molecular pump 26' is substituted for molecular drag pump 26. The pump 26' consists of a multiplicity of turbine blades connected to the shaft 18 of the pump 26', interleaved with stator blades supported by plate 29. It will be appreciated that pump 26' serves the same function as pump 26 in pumping gases evolving from the flywheel rotor 100 into gas storage chamber 27 containing the molecular sieves 27a. Turbo-molecular pump 26' may be used advantageously with some flywheel configurations in which more space is available along the shaft than in the configuration shown in FIG. 3.

FIG. 8 illustrates the mechanical gimbal assembly 80, consisting of a steel band 50 in the annular space between the outer housing 8 and vacuum housing 10. Band 50 is attached to the vacuum housing 10 by means of journal bearings 14 and 15, which are diametrically opposed to one another. A second set of journal bearings, 51 (shown) and 52 (not shown) also diametrically opposed to one another and are rotated by 90° (rotational degrees) from the first set of journal bearings 14, 15 connected to the band 50 on the outer surface of vacuum housing 10. This arrangement isolates the vacuum housing 10 which contains the flywheel assembly 100 from pitch and roll angular motions of the vehicle. The motor-generator torques are reacted by the gimbal 80, which also transmits the residual acceleration loads which result from the small departure from neutral buoyancy of the vacuum sphere in the flotation liquid 9. The journal bearing shafts are sized to shear under the high torque overloads which would occur in the event of a flywheel failure corresponding to bearing seizure. This is a safety feature to prevent the flywheel from jerking the vehicle.

In addition to these functions, the gimbal assembly also provides mechanical support for the power leads which must be routed from the outer housing into the vacuum housing to connect to the motor-generator.

The operation of the flywheel-motor-generator assembly will now be described in detail.

An object of the support system is to permit the flywheel 1 to safely perform its function as an energy buffer during all driving conditions, while consuming negligible power when the vehicle is parked, even on a steep hill. Since the surface speed of the rotor 100 may exceed 1000 meters per second at peak charge, the assembly 100 must be maintained in a vacuum. The small, oil lubricated ceramic ball bearings 30, 140 can provide the desired service life provided the mechanical loads are kept as low as possible. The overall design of this flywheel system is aimed at minimizing these loads.

It will be appreciated that placing the vacuum housing 10 in a gimbal system 80 makes the flywheel 1 nearly impervious to vehicle rotations. If the flywheel 1 were not gimbaled, a vehicle rotation would cause a gyroscopic torque of magnitude (HdP/dt), where H is the angular momentum of the flywheel 1 and dP/dt is the pitch or roll angular velocity of the vehicle. The reaction at each bearing of the unit depicted in FIG. 3, which preferably is capable of storing 2 KWH of energy at full charge, would be 6000 newtons per radian per second of vehicle pitch or roll. It will be appreciated that this represents a load that would shorten the life of the bearings on all but the smoothest of roads. The use of the gimbal system 80 described above reduces the moments exerted on the bearings 30, 140 to those produced by hydrodynamic forces on the vacuum housing 10 and the spring forces produced by the power leads. Because the liquid 9 provides nearly neutral buoyancy to the inner housing, the mechanical gimbal need not support the bulk of the acceleration loads, i.e., these loads mainly are borne by liquid 9. The mechanical gimbal need only react to the spin-up and spin-down torques developed by the motor-generator 17, which are 12.5 newton-meters when the flywheel 1 is delivering or accepting 80 kilowatts of power at its quiescent operating speed of 6400 radians per second. Thus, gimbal 80 preferably can have a small enough drag area to make the hydrodynamic torques it develops during vehicle pitching and rolling negligibly small.

During steady driving the orientation of the rotor axis is vertical, a consequence of the center of mass of the vacuum housing 10 and its contents being below the center of buoyancy, which arrangement advantageously produces a righting moment on vacuum housing 10. In this orientation, the weight of the assembly 100 is borne by the toroidal magnet 23 and the forces on the bearings are those produced by the preload spring 148. This advantageously can be made as small as the radial stiffness requirement permits.

When the vehicle is accelerating or braking, the spin axis is no longer vertical, aligning itself, after a transient, to the equivalent gravitational field which is the vector sum of the earth's gravitational acceleration and the vehicle's acceleration. Thus, the bearing load during steady accelerations is primarily axial. During transients, which cause a damped precessional motion of the axis, the bearings react to the small torques associated with this motion by exerting radial forces.

When the vehicle is parked, even on a hill, the spin axis is very close to vertical, just as in steady driving. The spring forces exerted by the power leads routed along the gimbal system 80 produce a torque tending to align the axis perpendicular to the hill, but these forces advantageously are small enough to keep the resulting offset from vertical negligibly small. With a vertical orientation of the rotor axis when the vehicle is stationary, the rotor weight is exactly offset by the magnet 23, thus minimizing the load on the bearings 12, 16, thereby maximizing bearing life.

Another object of the present invention is to provide adequate cooling of the motor-generator 17 under all driving conditions, the most demanding of which is a repetitive stop and go driving schedule. During this cyclic use, the motor-generator 17 is alternately delivering power as a generator when accelerating the vehicle or accepting power as a motor during dynamic braking. Even though it is advantageously very efficient in both operating modes, the high powers involved, e.g., many tens of kilowatts, create iron and copper losses which would lead to destructive temperatures in the motor-generator 17 if cooling were not provided.

Advantageously, one preferred embodiment according to the present invention provides effective cooling of the motor-generator stator 21a by circulating flotation liquid 9 through axial holes 20a in the metal cylinder 25, as previously described. Since the bearings 12, 16 provide very little thermal conduction from the rotating shaft 18, the rotor 21b of the motor-generator is cooled primarily by radiation. The shaft temperature needed for this thermal radiation can be maintained within acceptable limits by using a motor-generator design which minimizes rotor losses, such as a synchronous reluctance machine. The relatively cool spherical boundary, i.e., the vacuum housing 10, into which the rotating assembly 100 radiates helps keep the rotor temperature within acceptable limits.

Another object of the present invention is to protect the vehicle and its passengers from (a) an accidental sudden release of the stored energy or (b) transfer of angular momentum, events which could be caused either by vehicle collision or by mechanical failure of the flywheel 1. Although the energy of a full charge is only equivalent to that resulting from the burning of six ounces of gasoline, its potentially dangerous form of release, i.e., sudden release, must be considered. Preferably, four barriers are provided between the rotating assembly 100 and the outside: the vacuum housing 10, the liquid 9, the outer enclosure 8, and an outer wrapping of fiber composite material 52 which surrounds and supports the housing 8 using foam pads 53 in the intervening space. See FIG. 9.

The heat released by a full charge will produce an increase in the temperature in the fluid of approximately a few hundred degrees, causing no significant hazard. The sudden transfer of the rotor's angular momentum to the vehicle could jerk the vehicle dangerously, if such were permitted to happen. This is precluded in the preferred embodiment of the present invention by allowing the vacuum housing 10 to spin down gradually in the liquid 9 when pins in the mechanical gimbal shear in the event of bearing seizure or of rotor disintegration. This detail is shown in FIG. 8.

The foregoing description of a preferred embodiment of the invention has been presented for the purposes of illustration and description. It is not intended to be exhaustive or to limit the invention to the precise form disclosed, and many modifications and variations are possible in light of the above teaching. The embodiment was chosen and described in order to best explain the principles of the invention and its practical application to electric vehicles, thereby enabling others skilled in the art to best utilize the invention in various embodiments and with various modifications as are suited to the particular vehicle use contemplated. It is intended that the scope of the invention be defined by the claims appended hereto.

What is claimed is:

1. A safety system for a high energy density flywheel assembly, comprising:

a vacuum housing;

an energy absorbing suspension fluid;

an outer housing; and a reinforcing wrapping, arranged in the recited order and arranged to form a multiple barrier and energy dissipation means for protecting a vehicle and associated passengers from accidental sudden release of energy from the flywheel assembly, and further comprising a mechanical gimbal including shearable gimbal pins protecting the passengers and the vehicle from sudden transfer of angular momentum resulting from bearing seizure of at least one of a plurality of bearings or contact between said vacuum housing and said flywheel assembly, wherein gimbal pins in said gimbal shear so as to permit said vacuum housing to gradually spin down against the fluid disposed between said vacuum housing and said outer housing.

2. An improved integrated system for a flywheel-motor-generator assembly providing mobile energy storage and surge power generation, said system comprising:

an outer housing a vacuum housing within said outer housing wherein said vacuum housing and said outer housing define a cavity;

a pump for circulating a liquid in a predetermined portion of said cavity so as to transfer waste heat to said radiator; and a radiator;

said improvement comprising:

a reinforcing wrapping;

wherein said liquid is an energy absorbing liquid, wherein said vacuum housing, said energy absorbing liquid, said outer housing and said reinforcing wrapping are arranged in the specifically recited order, which arrangement forms a multiple barrier and energy dissipation mechanism protecting a vehicle and associated passengers from accidental sudden release of energy from the flywheel assembly, and wherein said radiator is disposed outside of said reinforcing wrapping.

3. The improved integrated system for a flywheel-motor-generator assembly as recited in claim 2, further comprising a mechanical gimbal including shearable gimbal pins protecting the passengers and the vehicle from sudden transfer of angular momentum resulting from bearing seizure of at least one of a plurality of bearings or contact between said vacuum housing and said flywheel assembly, wherein gimbal pins in said gimbal shear so as to permit said vacuum housing to gradually spin down against said energy absorbing liquid disposed between said vacuum housing and said outer housing.

4. The improved integrated system for a flywheel-motor-generator assembly as recited in claim 2, wherein a stator of said flywheel-motor-generator is disposed proximate to said predetermined portion of said cavity.

5. The improved integrated system for a flywheel-motor-generator assembly as recited in claim 2, further comprising a plurality of shearable support members operatively disposed between said outer housing and said vacuum housing.

6. The improved integrated system for a flywheel-motor-generator assembly as recited in claim 2, wherein the flywheel-motor-generator assembly has a respective center of mass, wherein said vacuum housing has an associated center of buoyancy and wherein said center of buoyancy is disposed with respect to said center of mass so as to produce a righting moment allied to the flywheel-motor-generator assembly.

7. The flywheel assembly system as recited in claim 6, wherein said righting moment is applied to a rotor axis of the flywheel-motor-generator assembly so as to permit alignment of the rotor axis along a vertical during steady driving or when the vehicle is parked, irrespective of the orientation of the vehicle.

8. The improved integrated system for a flywheel-motor-generator assembly as recited in claim 2, wherein said liquid outside of said portion is pumped so as to maintain said vacuum housing wetted by said liquid outside of said portion at close to ambient temperature.

9. An isolation system for a flywheel-motor-generator assembly providing mobile energy storage having a support system including a liquid suspension system comprising an outer housing, a vacuum housing disposed within said outer housing, wherein said vacuum housing and said outer housing define a cavity capable of being filled with liquid, a radiator fluidly coupled to said cavity, and a pump operatively connected to said radiator and said cavity, wherein said pump, said radiator and said cavity define a cooling loop whereby said liquid is circulated between said radiator and said cavity so as to transfer waste heat to said radiator, said isolation system comprising:

a reinforcing wrapping; and a mechanical gimbal including shearable gimbal pins for protecting the passengers and the vehicle from sudden transfer of angular momentum resulting from either bearing failure or contact between said vacuum housing and said flywheel assembly, wherein said liquid comprises an energy absorbing suspension liquid, wherein said vacuum housing, said cavity in which said energy absorbing liquid and said mechanical gimbal are disposed, said outer housing and said reinforcing wrapping are arranged in the specifically recited order to form a multiple barrier and energy dissipation means for protecting a vehicle and associated passengers from accidental sudden release of energy or said angular momentum from the flywheel assembly, wherein said gimbal pins in said gimbal shear so as to permit said vacuum housing to gradually spin down against said energy absorbing suspension liquid disposed between said vacuum housing and said outer housing, and wherein said radiator is disposed outside of said reinforcing wrapping.

10. The isolation system as recited in claim 9, wherein said vacuum housing includes a member thermally coupled to a stator of said flywheel-motor-generator, said stator being disposed proximate to said member, and wherein said energy absorbing suspension liquid flows through said member thereby providing cooling of said flywheel-motor-generator.

11. The isolation system as recited in claim 9, wherein the flywheel-motor-generator assembly has a respective center of mass, wherein said vacuum housing has an associated center of buoyancy and wherein said center of buoyancy is disposed with respect to said center of mass so as to produce a righting moment applied to the flywheel-motor-generator assembly.

12. The isolation system as recited in claim 11, wherein said righting moment is applied to a rotor axis of the flywheel-motor-generator assembly so as to permit alignment of the rotor axis along a vertical when an associated vehicle is parked irrespective of orientation of the vehicle.

13. The isolation system as recited in claim 9, wherein said liquid outside of said portion is forcibly circulated so as to maintain said vacuum housing wetted by said energy absorbing suspension liquid outside of said member at ambient liquid temperature.

* * * * *